United States Patent Office 3,489,745
Patented Jan. 13, 1970

3,489,745
DIBENZO-AZACYCLOALKANE-N-CARBONYL CHLORIDES
John W. Cusic and William E. Coyne, Skokie, Ill., assignors to G. D. Searle & Co., Chicago, Ill., a corporation of Delaware
No Drawing. Continuation-in-part of applications Ser. No. 409,611, Nov. 6, 1964, and Ser. No. 479,011, Aug. 11, 1965. This application June 8, 1967, Ser. No. 644,483
Int. Cl. C07c 35/24, 41/04, 41/08
U.S. Cl. 260—239                                    6 Claims

ABSTRACT OF THE DISCLOSURE

The present dibenzo-azacycloalkane-N-carbonyl chlorides are useful intermediates in the preparation of compounds possessing pharmacological properties. They are prepared by the reaction of a dibenzo-azacycloalkane with phosgene or thiophosgene.

SUMMARY OF THE INVENTION

The present application is a continuation-in-part of application Ser. No. 409,611, filed Nov. 6, 1964, now U.S. Patent 3,336,293 and application Ser. No. 479,011, filed Aug. 11, 1965, now U.S. Patent 3,336,303.

The present invention relates to a group of azacycloalkane-N-carbonyl chlorides. In particular it relates to a group of compounds having the following general formula

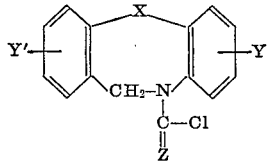

wherein X is selected from the group consisting of a bond connecting the two phenyl rings, methylene, ethylene, and vinylene; Y and Y' are each selected from the group consisting of hydrogen and halogen; and Z is selected from the group consisting of O and S. The halogens referred to above are preferably chlorine.

Depending on the value assigned to X, the tricyclic nucleus in the above formula can be 5,6-dihydrophenanthridine, 5,6-dihydromorphanthridine, 5,6-dihydrodibenz[b,f]azocine, and 5,6,11,12-tetrahydrodibenz[b,f]azocine.

The compounds of the present invention are prepared from the appropriate tricyclic amine of the formula

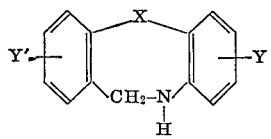

wherein X, Y, and Y' are defined as above. This amine is reacted with phosegene or thiophosgene in an inert solvent in the presence of a teritary amine to give the desired compounds. More specifically, for example, a toluene solution of phosgene is diluted with ether and then reacted with a methylene chloride solution of the tricyclic amine and a tertiary amine and the desired product is obtained.

The present compounds can be used as intermediates in the preparation of a variety of compounds. Thus, reaction of the carbonyl chloride with a dialkylaminoalkyl amine according to the procedure described in application Ser. No. 409,611, filed Nov. 6, 1964 gives the corresponding substituted amide. The amides of the indicated application possess a number of useful properties. Thus, they possess anti-inflammatory activity and anti-atherogenic activity.

In addition, the indicated aminoalkyl amides possess anti-biotic activity against a variety of organisms. Thus, they inhibit the growth of bacteria such as *Diplococcus pneumoniae*, protozoa such as *Teterahymena gelleii*, fungi such as *Trichophyton mentagrophytes* and *Candida albicans*, and alage such as *Chlorella vulgaris*. The compounds can thus be combined with various known excipients and adjuvants in the form of dusts, solutions, suspensions, ointments, and sprays to provide compositions useful for disinfecting purposes.

As an exemplification of this type of amide, 5,6-dihydro-11H-dibenz[b,e]azepine-5-carbonyl chloride can be reacted with 2-diethylaminoethylamine to give N-(2-diethylaminoethyl) - 5,6 - dihydro-11H-dibenz[b,e]azepine-5-carboxamide. Reaction of this amide with oxalic acid gives the corresponding oxalate salt and the addition of 5 mg. of this salt to an agar plate inoculated with *Candida albicans* inhibits the growth of this organism.

The present carbonyl chlorides can also be reacted with hydrazine and substituted hyrazines according to the procedure described in application Ser. No. 479,011, filed Aug. 11, 1965, now U.S. Patent 3,336,303. The hydrazides obtained in this way possess useful pharmacological properties. In particular, they possess anti-convulsant activity as demonstrated by their antagonism of electroshock seizures. They also posess analgesic activity.

The following examples are presented to further illustrate the present invention; they should not be construed as limiting it in spirit or in scope. In these examples, quantities are indicated in parts by weight and temperatures in degrees centigrade (° C.).

EXAMPLE 1

To a stirred solution of 25 parts of phosgene in 45 parts of toluene at 5° C. there is first added 140 parts of ether and then a solution of 27 parts of 5,6-dihydrophenanthridine and 15.2 parts of triethylamine in 268 parts of methylene chloride. During this addition, the temperature is maintained at about 7° C. The resultant suspension is stirred for 2 hours after addition is complete and then filtered. The solvent is evaporated from the filtrate and the resultant residue is recrystallized from a mixture of benzene and petroleum ether to give 5,6-dihydrophenanthridine-5-carbonyl chloride melting at about 63.5–65.5° C.

EXAMPLE 2

A solution is prepared from 20 parts of phosgene and 45 parts of toluene, and cooled to 5° C.; 105 parts of ether is added. The solution is then maintained at about 7° C. while a solution of 23 parts of 5,6-dihydromorphanthridine and 12 parts of triethylamine in 270 parts of methylene chloride is added. The mixture is stirred for an additional hour and filtered and the solvent is evaporated from the filtrate. The resultant residue is recrystallized from petroleum ether to give 5,6-dihydromorphanthridine-5-carbonyl chloride melting at about 98–102° C.

EXAMPLE 3

The procedure of Example 1 is repeated using 22 parts of 5,6,11,12-tetrahydrodibenz[b,f]azocine, 21 parts of phosgene and 10.5 parts of triethylamine. The crude product is recrystallized from petroleum ether to give 5,6,11,12 - tetrahydrodibenz[b,f]azocine-5-carbonyl chloride melting at about 95.5–97.5° C.

EXAMPLE 4

4.1 parts of 5,6-dihydrodibenz[b,f]azocine is reacted with 2 parts of phosgene in the persence of 1.8 parts of triethylamine according to the procedure described in Example 1. The crude product obtained from the reaction mixture is recrystallized from petroleum ether to give 5,6-dihydrodibenz[b,f]azocine-5-carbonyl chloride melting at about 125–127° C.

EXAMPLE 5

8-chloro-5,6-dihydromorphanthridine is reacted with phosgene according to the procedure described in Example 2. The product obtained in this way is 8-chloro-5,6-dihydromorphanthridine-5-carbonyl chloride.

EXAMPLE 6

To a stirred solution of 3.5 parts of thiophosgene in 25 parts of toluene at 5° C. there is first added 70 parts of ether and then a solution of 5.0 parts of 5,6-dihydromorphanthridine and 3.0 parts of triethylamine in 200 parts of methylene chloride while the temperature is maintained at 5–10° C. The suspension is stirred for 1 hour after the addition is complete; it is then filtered and the solvent is evaporated from the filtrate to leave a dark brown residue. The residue is extracted with 90 parts of hot benzene and the solvent is evaporated from the benzene solution to give 5,6-dihydromorphanthridine-5-thiocarbonyl chloride.

What is claimed is:
1. A compound of the formula

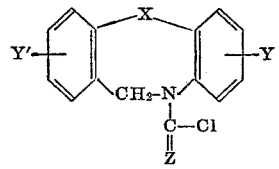

wherein X is selected from the group consisting of a bond connecting the two phenyl rings, methylene, ethylene, and vinylene; Y and Y' are each selected from the group consisting of hydrogen and chlorine; and Z is selected from the group consisting of O and S.

2. A compound according to claim 1 which is 5,6-dihydrophenanthridine-5-carbonyl chloride.

3. A compound according to claim 1 which is 5,6-dihydromorphanthridine-5-carbonyl chloride.

4. A compound according to claim 1 which is 5,6,11,12-tetrahydrobenz[b,f]azocine-5-carbonyl chloride.

5. A compound according to claim 1 which is 5,6-dihydrodibenz[b,f]azocine-5-carbonyl chloride.

6. A compound according to claim 1 which is 5,6-dihydromorphanthridine-5-thiocarbonyl chloride.

References Cited

FOREIGN PATENTS 739,479  7/1966  Canada.

ALTON D. ROLLINS, Primary Examiner

U.S. Cl. X.R.

260—287